Dec. 24, 1957       R. P. WALROD       2,817,589
PROCESS FOR THE PRODUCTION OF FRUIT JUICE
IN THE NATURAL STATE THEREOF
Filed Aug. 18, 1954
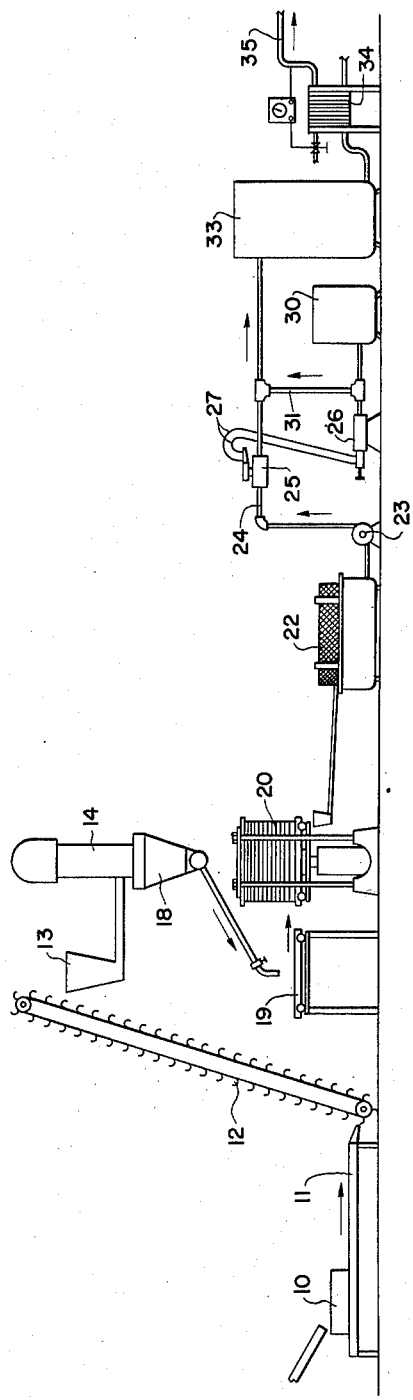
INVENTOR
RILEY PAUL WALROD
BY
Fetherstonhaugh & Co.
ATTORNEYS

United States Patent Office 2,817,589
Patented Dec. 24, 1957

2,817,589

PROCESS FOR THE PRODUCTION OF FRUIT JUICE IN THE NATURAL STATE THEREOF

Riley Paul Walrod, Kelowna, British Columbia, Canada

Application August 18, 1954, Serial No. 450,651

4 Claims. (Cl. 99—105)

This invention relates to a process for producing fruit juice, and particularly apple and pear juice, in the natural state thereof.

The goal of researchers in the field of fruit juice preparation has long been to produce a juice having all the characteristics of the juice as it originally exists in the cells of the living fruit. Prior to this invention, the research in the case of apple and pear juice has not been very successful.

When an apple is cut, the flesh is seen to have a bright milky-white appearance. The juice contained in the cells of the flesh has the same appearance, and a pronounced apple odour and flavour. On standing in contact with the air, even for a short period, however, the exposed apple flesh and juice begin to oxidize and take on an unattractive brown color. This oxidation is caused mainly by the peroxidase enzymes in the apple flesh which assist the oxygen present in the air or in the tissues of the fruit to react with substances in the cells associated with colour and flavour of the live tissues. The oxidation brings about a change in colour and flavour by either converting the existing substances into new substances by addition or splitting of original molecules into multiple entities. Any process which will prevent this oxidation, or completely reverse the reaction after it has taken place, will result in a juice almost identical to that which is naturally contained in the flesh of the living fruit.

The earliest, and still most common, methods of apple juice manufacture made no attempt to prevent the action of the air from oxidizing and thus darkening the juice, and so resulted in a product which lacked the characteristic flavour, odour, colour, and appearance of juice existing in the cells of the fresh, living apple. Such juices are either canned or bottled in the cloudy oxidized state, or are clarified by the use of chemicals or enzymes followed by filtration, to give a clear, amber-coloured product with a pleasant distinctive taste, but lacking any characteristic odour or flavour of the fresh apple.

Several attempts have been made to produce a "natural" type juice by protecting the fruit from the air during the milling operation, thus preventing or retarding oxidation. In one such process, the apples are sliced and passed through a comminuter extractor which grinds the apples and forces the fine particles and juice through special rubber screens. The juice is drawn from the extractor through a vacuum line and de-aerated, and is then homogenized, sterilized and canned in the usual manner. The fresh fruit flavour in this type of juice is much stronger than in the clarified juice referred to above, but is somewhat obscured by a "floury" taste imparted by the finely divided pulp particles. This suspended matter also detracts from the appearance of the juice.

In another process an ascorbic acid solution is sprayed onto the apples while they are being milled. The antioxidant properties of ascorbic acid are utilized to protect the fruit from the action of the air. In other words, a selective oxidation takes place. When sufficient ascorbic acid is sprayed onto the apple pulp, this acid instead of the apple itself is acted upon by the oxygen in the air and is used up. The mechanism of this oxidation process is thought to be closely tied to the enzyme activity of the apple flesh. During the milling operation large amounts of air are incorporated into the apple pulp. Large quantities of ascorbic acid are therefore required to protect the apple juice. In the subsequent pressing operation, more air is introduced into the juice, resulting in further loss of this added ascorbic acid. After the juice is pressed from the fruit with a hydraulic press in the usual manner, it is then sterilized and canned. De-aeration may also be used as a step in this process. The chief drawback to this method is the large amount of ascorbic acid necessary to prevent oxidation. Indeed, for certain conditions of fruit it is practically impossible to prevent oxidation using ascorbic acid in the milling operation, possibly because of a high enzyme activity. The manufacture of "natural" type apple juice using ascorbic acid in the milling operation is technically possible. However, the high ascorbic acid losses and the uncertainty of the protection against oxidation make this process commercially uneconomical and therefore impractical.

For the sake of convenience, apples and apple juice will be mainly referred to throughout this description, but it is to be understood that the remarks and process apply equally well to pears and pear juice.

The main object of this invention is the production of apple and pear juice having its natural colour, odour, flavour and appearance in an economical and practical manner.

The present invention has resulted from the discovery that ascorbic acid may be added to apple juice which has been subjected to oxidation to reverse the oxidation process provided the latter has not proceeded too far. In other words, the acid must be added to the juice before the existing substances therein have been changed into new substances. As any such new substances are evidenced as a precipitate in the juice, it is necessary to add the acid before any precipitate is formed.

A great advantage resulting from this process lies in the fact that it is not necessary to take any steps to reduce or stop oxidation during the ordinary methods of separating the juice from the fruit pulp. The oxidation does take place, but as soon as the ascorbic acid is added to the juice, the oxidation process is reversed and the juice regains substantially its natural odour, flavour, colour and appearance. It is desirable to add the acid as soon after the juice is extracted from the pulp as possible. Completely successful results have been obtained in a commercial way any time up to 30 minutes after the extraction. However, it has also been found possible to add the acid any time up to about two hours, but the conditions have to be just right in order to attain success during the longer periods.

The exact amount of ascorbic acid required for the process is dependent upon the condition of the fruit, the variety of the fruit, the temperature, and even the conditions under which the fruit was grown. As the fruit in any processing operation is generally practically the same, the condition of the juice expressed therefrom is more or less an average of the condition of the fruit itself. An important advantage of this process lies in the fact that it is only necessary to keep adding ascorbic acid until the juice regains its natural milky-white appearance. As long as there are any oxidation products in the juice, the acid will continue to be oxidized, reversing the original reaction. Thus, the acid may be added until free biologically active ascorbic acid appears in the juice. When this takes place, the oxidation process has been completely reversed. It is desirable to provide a slight excess of acid in order to protect the juice from air during the canning process.

The ascorbic acid may be added to the juice in batches, but this process is such that it lends itself to continuous operation.

It is obvious that the amount of ascorbic acid required is very small compared to the use of this acid in the milling stage. The acid is not wasted in protecting the pulp, and none is lost with the latter.

A commercial process for manufacturing this type of apple juice is as follows:

The apples are dumped into a washer, through which they pass and are washed thoroughly with sprays of water at high pressure. Next they pass over an inspection belt where workers remove any undesirable fruit and trim any bruised portions. The fruit is then given an additional rinsing and passes into a hammermill or disintegrator in which the fruit is ground to a fine pulp. The juice is then expressed from the pulp in the usual manner using press blankets and wooden racks in a hydraulic press. Any suspended pulp is removed by passing the juice through a revolving screen. The juice from this stage is pumped through an enclosed system, and ascorbic acid solution is injected into it continuously in sufficient quantity to reverse the oxidation which had taken place and produce an apple juice similar in colour, odour, flavour and appearance to juice occuring naturally in the cells of the fresh ripe fruit.

If a sample of freshly pressed juice, without any added ascorbic acid is taken, and observed over a period of time it will be seen to gradually darken on contact with the air. This darkening will increase until eventually the juice will be a dark brown color, and a dark colored precipitate will begin to form. This precipitate is evident even in samples containing no suspended solids and is probably due to collodal material in the juice being oxidized. Once the oxidation process has reached this point, no amount of added ascorbic acid will reverse the process. In other words, the ascorbic acid must be added to the juice as soon as possible after pressing.

During the addition of the ascorbic acid, the juice will be seen to become gradually lighter in color until finally the milky-white colour of the original juice appears. Until this end point is reached, the ascorbic acid is reacting with the oxidation products to reverse the oxidation process. On reaching the end-point, however, free biologically active ascorbic acid appears in the juice and may be measured by any accepted analytical method. It is good commercial practice to carry at least 10 mgm. of ascorbic acid per 100 ml. of juice in the final product to guard against any chance inclusion of air during canning. The exact amount of ascorbic acid required for the process is dependent upon the condition of the fruit, the variety of fruit, the temperature, and even the conditions under which the fruit is grown. In commercial operation, the juice from the individual apples is blended sufficiently so that any changes in the condition of the juice are gradual. By actual test, downward trends in the ascorbic acid residual may be detected in time to increase the quantity of the acid injected, thus maintaining a safe level at all times. If biologically active ascorbic acid is found in the treated juice by actual test, sufficient acid has been used.

The figure in the accompanying drawings diagrammatically illustrates an example of apparatus for carrying out this process.

As all the equipment used in this example is well-known, it will not be described herein in detail.

The apples are directed into a washer 10 through which they pass and are washed thoroughly with sprays of water at high pressure. From here they pass over an inspection belt 11, where the workers remove any undesirable fruit and trim any bruised portions, to an elevator 12, whence they drop into a hopper 13 of a disintegrator 14, in which the fruit is ground to a fine pulp. The ground pulp drops into a hopper 18 and is directed on to blanket racks 19 of a hydraulic press 20. When sufficient racks are placed in the press, the latter is operated to squeeze out the juice from the pulp, said juice being directed on to a rotating screen 22 for the separation of any fine pulp material therefrom. A pump 23 directs the juice through a pipe 24 having an operating meter 25 therein. This meter operates a piston proportioning pump 26 by means of compressed air through lines 27 in the manner well-known with this type of equipment. The proportioning pump conducts ascorbic acid from a container 30 through pipe 31 into the juice in pipe 24. Thus, the amount of acid supplies to the juice is governed by the flow of the latter through the operating meter 25. The stroke of the piston in pump 26 may be adjusted to regulate the proportion of ascorbic acid to raw juice. The juice and ascorbic acid are directed into a surge tank 33. This tank not only reduces surging in the lines, but allows sufficient time for the acid to do its job in reversing the oxidizing process which had taken place earlier during the separation of the juice from the fruit pulp. The treated juice then passes through a plate sterilizer 34, after which it runs through a pipe 35 to a canning line, not shown.

As stated above, samples of the treated juice may be tested regularly to be sure that there is free biologically active ascorbic acid in it, and to determine the amount of said acid. The proportioning pump 26 is always operated so as to provide sufficient acid for the reversing process, and to allow for a little free acid in the final product to protect it against exposure to air, if such should take place.

What I claim as my invention is:

1. The process of producing fruit juices from apples and pears similar in colour, odour, flavour and appearance to the juice in its natural state when in the cells of the ripe fruit, which comprises crushing the raw fruit, expressing the juice from the fruit pulp, and adding sufficient ascorbic acid to said juice as soon as possible after the juice is expressed from the pulp to reverse the oxidation process which has occurred in the preceding steps and before said oxidation has proceeded to the stage when a precipitate is evident in the juice.

2. The process of producing fruit juices from apples and pears similar in colour, odour, flavour and appearance to the juice in its natural state when in the cells of the ripe fruit, which comprises crushing the raw fruit, expressing the juice from the fruit pulp, adding sufficient ascorbic acid to said juice as soon as possible after the juice is expressed from the pulp to reverse the oxidation process which has occurred in the preceding steps and before said oxidation has proceeded to the stage when a precipitate is evident in the juice, and then subjecting the juice to flash sterilization.

3. The process of producing fruit juices from apples and pears similar in colour, odour, flavour and appearance to the juice in its natural state when in the cells of the ripe fruit, which comprises crushing the raw fruit, expressing the juice from the fruit pulp, adding dissolved ascorbic acid to said juice as soon as possible after the juice is expressed from the pulp and before the oxidation which has occurred in the preceding steps has proceeded to the irreversible stage, said acid being added until free biologically active ascorbic acid appears in the juice, at which time the oxidation process has been completely reversed, and subjecting the juice to a rapid heating action for a period sufficient to render it commercially sterile.

4. The process of producing fruit juices from apples and pears similar in colour, odour, flavour and appearance to the juice in its natural state when in the cells of the ripe fruit, which comprises crushing the raw fruit, expressing the juice from the fruit pulp, adding dissolved ascorbic acid to said juice within thirty minutes of the time the juice has been expressed from the pulp and before the oxidation which has occurred in the preceding step has proceeded to the stage when a precipitate is evident in the juice, said acid being added until free biologically active ascorbic acid appears in the juice, at which time the oxidation process has been completely reversed, and subjecting the juice to a rapid heating action for a period sufficient to render it commercially sterile.

References Cited in the file of this patent

The Fruit Products Journal and American Food Manufacturer, September 1946 issue, vol. 26, No. 1, pages 11 to 14 and 29. Pages 1 to 4, article "The Fortification of Fruit Juices With Ascorbic Acid," by W. T. Esselen et al.